(12) United States Patent
Claret et al.

(10) Patent No.: US 7,483,435 B2
(45) Date of Patent: Jan. 27, 2009

(54) PROCESS FOR THE TRANSMISSION OF DATA BY A MULTI-USER, POINT TO MULTI-POINT DIGITAL DATA TRANSMISSION SYSTEM

(75) Inventors: Jorge Vicente Blasco Claret, Valencia (ES); Juan Carlos Riveiro Insúa, Valencia (ES); Judit Carreras Areny, Valencia (ES); David Ruiz López, Valencia (ES)

(73) Assignee: Diseno de Sistemas en Silicio, S.A., Paterna (Valencia) (ES)

( * ) Notice: Subject to any disclaimer, the term of this patent is extended or adjusted under 35 U.S.C. 154(b) by 639 days.

(21) Appl. No.: 10/892,822

(22) Filed: Jul. 16, 2004

(65) Prior Publication Data
US 2005/0018703 A1 Jan. 27, 2005

Related U.S. Application Data

(63) Continuation of application No. PCT/ES03/00012, filed on Jan. 14, 2003.

(30) Foreign Application Priority Data
Jan. 18, 2002 (ES) ............................... 200200101

(51) Int. Cl.
*H04L 12/56* (2006.01)
(52) U.S. Cl. .................. 370/395.4; 370/235; 370/349; 370/536
(58) Field of Classification Search .............. 370/395.4, 370/235, 349, 536
See application file for complete search history.

(56) References Cited
U.S. PATENT DOCUMENTS

| | | | |
|---|---|---|---|
| 3,982,074 A | * | 9/1976 | Clark .......................... 370/538 |
| 3,982,077 A | * | 9/1976 | Clark et al. .................. 370/535 |
| 4,939,723 A | * | 7/1990 | Harley, Jr. et al. ........... 370/538 |
| 5,239,662 A | * | 8/1993 | Danielson et al. ........... 709/246 |
| 5,392,223 A | * | 2/1995 | Caci ........................... 709/218 |
| 6,064,652 A | * | 5/2000 | Buckland et al. ............ 370/235 |

(Continued)

FOREIGN PATENT DOCUMENTS

EP 0973290 1/2000

(Continued)

OTHER PUBLICATIONS

Patent Abstracts of Japan, JP 11298431 (Nippon Telegraph & Telephone Corp.) Oct. 29, 1999.

*Primary Examiner*—Huy D Vu
*Assistant Examiner*—Luat Phung
(74) *Attorney, Agent, or Firm*—Klauber & Jackson, LLC

(57) ABSTRACT

The invention describes a data transmission method for a multi-user. multipoint-to-multipoint digital data transmission system involving a plurality of users equipment (1) which are bidirectionally connected via physical medium (6). The method is intended to communicate one (1a) user to several (1b-1d) users equipment at different speeds, sending multiple frames, maintaining the bandwidth and maximum latency values required by each destination user (1b-1d). Further, this method consists in using the percentage reserve of the frame, providing a quality of service based on that required by the user equipment and supplying a criterion for dynamically assigning the packets sent to each user equipment in the frame, grouping or dividing them.

7 Claims, 2 Drawing Sheets

U.S. PATENT DOCUMENTS

| | | | |
|---|---|---|---|
| 6,469,982 B1 * | 10/2002 | Henrion et al. | 370/230 |
| 6,570,891 B1 * | 5/2003 | Arimilli | 370/536 |
| 6,650,697 B1 * | 11/2003 | Tate et al. | 375/222 |
| 6,891,841 B2 * | 5/2005 | Leatherbury et al. | 370/401 |
| 6,912,575 B1 * | 6/2005 | Swift et al. | 709/226 |
| 6,940,845 B2 * | 9/2005 | Benveniste | 370/349 |
| 6,993,340 B1 * | 1/2006 | Rinne et al. | 455/450 |
| 7,035,294 B2 * | 4/2006 | Dove et al. | 370/535 |
| 2003/0217362 A1 * | 11/2003 | Summers et al. | 725/63 |
| 2005/0018703 A1 * | 1/2005 | Blasco Claret et al. | 370/432 |

FOREIGN PATENT DOCUMENTS

GB 2259229 3/1993

* cited by examiner

PROCESS FOR THE TRANSMISSION OF DATA BY A MULTI-USER, POINT TO MULTI-POINT DIGITAL DATA TRANSMISSION SYSTEM

RELATED APPLICATIONS

The present application is a Continuation of co-pending PCT Application No. PCT/ES03/00012, filed Jan. 14, 2003, which in turn, claims priority from Spanish Application Serial No. 200200101, filed Jan. 18, 2002. Applicants claim the benefits of 35 U.S.C. §120 as to the PCT application and priority under 35 U.S.C. §119 as to said Spanish application, and the entire disclosures of both applications are incorporated herein by reference in their entireties.

TECHNICAL FIELD OF THE INVENTION

The invention applies to various user modems in two-way communication over a physical medium. The process allows multiple transmissions of information at various speeds between a user modem and numerous addressee user modems while maintaining the values for bandwidth and maximum latency required by each of the addressee user modems.

The process comprises the sending of various frames of information from a modem to numerous addressee user modems at various speeds and furthermore achieves quality of service per user modem by reserving a percentage of the frame, and provides a criterion to dynamically assign the packets sent to each user modem in the frame, by grouping or dividing the packets to be sent.

OBJECT OF THE INVENTION

The current invention, as suggested in the title, consists of a process for the transmission of data by a multi-user, point to multi-point digital data transmission system. The process refers to the means of carrying out access control in the transmission medium in the downstream channel, that is to say, the manner by which transmission is carried out from a user modem to numerous other user modems.

The principal objective of the process in this invention is to maximize transmission capacity by means of distributing the bandwidth available in the physical medium between the different user modems to whom it is transmitted according to the maximum latency requirements established by each one of the user modems.

The technical field of the invention is the telecommunications sector, and more specifically two-way communications between various users using any transmission means.

BACKGROUND OF THE INVENTION

The use of point to multi-point systems, where various modems send information to each other using the same physical medium, is known in the prior art. The main problem in these systems is that unless the transmission network is symmetrical for each user, something that is unlikely to occur in reality, the user modems receivers will not be able to receive information from the various transmitters at equal levels of quality due to the fact that attenuation and channel noise in the downstream (the channel that runs from a user modem transmitter to the receiver in another user modem) depends on which transmitter and receiver are involved in each case and the behaviour of the channel at each moment.

This problem makes it very difficult to maintain both the bandwidth requirements and the maximum latency necessary to be able to transmit different types of traffic in the point to multi-point systems available to date.

Furthermore, in cases where the transmission medium response in time is variable rather than fixed, as is the case of low voltage electricity networks or mobile networks, this technical problem becomes more important due to the need to modify the configuration of the communication so as to be able to maintain the requirements for latency and bandwidth at all times.

The current invention solves this technical problem, allowing said quality of service requirements (bandwidth and maximum latency) to be maintained independently of the characteristics of the physical medium and the communication.

Other systems that allow the inclusion of quality of service (QoS) in a communication exist in the prior art. In this context mention must be made of the Spanish Patent submission No 200003024 concerning a "POINT TO MULTIPOINT SYSTEM AND PROCESS FOR THE TRANSMISSION OVER THE ELECTRICITY NETWORK OF DIGITAL DATA", as well as Spanish Patent submission No 200100916 concerning a "PROCESS FOR MULTIPLE ACCESS AND MULTIPLE TRANSMISSION OF DATA IN A MULTI-USER SYSTEM FOR THE POINT TO MULTIPOINT DIGITAL TRANSMISSION OF DATA OVER THE ELECTRICITY NETWORK", both of which present a solution for the inclusion of quality of service (QoS) for communication point to multi-point over the electricity network, and where a single transmitter (the head-end modem) communicates with various users (user modems). The process in the present invention improves this process to allow the inclusion of quality of service (in terms of bandwidth and maximum latency) in point to multi-point communications, so that any user modem may transmit information to any other user and the communication is not limited to a variable time medium such as the low voltage electricity network but can also be employed in any other transmission medium used as a communications channel in point to multi-point transmissions.

Another relevant background art can be found in document EP 0 973 290 A2 which relates to multiplexing data packets in a data service channel with data in one or more digital video signals channels to form a multiplexed output signal. The data in the data service channel may include control data, conditional access data, electronic program guides, paged data services, service information, broadcast internet information, and business information such as financial share information. The data packets each comprise a time stamp indicating a requested delivery time and the data packets are sorted into a queue in time stamp order. The urgency of the data service channel is calculated as a function of the queue length and requested delivery times. The share of the bit rate of the multiplexed output signal allocated to the data service channel is varied according to its urgency. An error value is calculated for each data packet to represent the error between the expected delivery time and the requested delivery time to the head of the queue and the urgency of the data channel is derived as an average of the error values. The average may be a weighted average.

Therefore, the present invention presents a process that maintains said requirements including when attenuation, noise and channel response vary dynamically not only in frequency but also in time for each user modem.

DESCRIPTION OF THE INVENTION

To achieve the objectives and avoid the inconveniences indicated in the previous paragraphs, this invention as claimed has developed a new process for the transmission of data in the downstream of a multi-user, point to multi-point, digital data transmission system where various user modems are in two-way communication over a physical medium. The downstream channel is that which is used by a user modem to transmit information to a series of user modem that receives the information and the upstream channel is by definition, the opposite.

The process described in this invention is characterized because it comprises transmission of information at different speeds to different user modems using the same physical medium; because time division in the downstream channel adaptable to the different transmission speeds and the different users is carried out, because packet size is optimised to the means of communication, and this size may be different to that used in the upper layers of the communication by the transmitter; and because packets with different priorities for user modems or groups of user modems are transmitted by means of reservation of channel time based on the quality required by these.

All these characteristics allow to guarantee a determined bandwidth and a determined maximum latency for the various users in the downstream channel, delivering quality of service (QoS) for the communication traffic based on different bandwidth requirements and latency for different user modems.

To carry out time division in the downstream channel that is adaptable to the transmission speeds of the various users, all the packets sent by the physical medium must occupy the same channel time but at different lengths, since the information is transmitted at different speeds and these transmission speeds depend of the number of bits per symbol to be used by each user modem. The length of the packets sent may be less than or equal to a fixed maximum (in number of bits).

In order that the packets occupy the same channel time, the number of symbols for each packet is fixed in what is conventionally called the Maximum Tranfer Unit (MTU) in the transmitter. This number of symbols is adjusted to a value that is adequate to reach a compromise between efficiency in the transmission of bits per second and quality of service in terms of latency. The process allows different types of traffic from the unit used for transmitting packets (MTU). Among the various types of traffic allowed is traffic without minimum latency and bandwidth requirements, traffic with constant bit rates (CBR), traffic with variable bit rates (VBR), and traffic with reserved bandwidth and fixed maximum latency.

Due to the fact that the number of symbols sent is a fixed number per packet, the packets that must be sent to the various-users are grouped and/or divided in the transmitter. In this way, packet size is fixed to the number of symbols in the unit used for transmission, the Maximum Transfer Unit (MTU).

Due to the fact that the duration of the symbols is fixed and always the same, the number of symbols for each packet sent is also fixed.

The downstream channel is divided into a series of frames with a fixed number of packets. In these frames different percentages of packets to be sent to the addressee user groups are reserved. Each user group contains users who share the same quality of service requirements for their traffic, this quality being reserved bandwidth and/or maximum latency.

If the percentage reserved for a user or group of addressee users is not used, this percentage may be distributed between the remaining modems or groups of user modems that will transmit information. This is carried out according to a determined configuration of traffic to be transmitted.

In the percentage reserved for packets in the frame by each user group, each user in the group has a certain percentage according to its own quality of service depending on whether it has reserved bandwidth and/or maximum latency requirements.

The process of the invention includes storing of packets to be transmitted to different users in a series of queues in the transmitter. These transmission queues are queues per user where the packets are ordered according to priority, said priority being fixed by an upper protocol. Having the packets stored in such queues allows the extraction of packets ordered according to priority. Therefore, the transmitter groups packets and decides on not only which is the next packet to be transmitted, but to whom, and the size of that packet.

The following drawings are provided to facilitate a better understanding of the present invention and while forming an integral part of the detailed description and the claims, they offer an illustrative but not limited representation of the principles of this invention.

DESCRIPTION OF AN EMBODIMENT OF THE INVENTION

Hereafter follows a description of a preferred embodiment of the invention, making reference to the numeration used in the Figures.

This example concerns a digital transmission system for the two-way transmission of data point to multi-point, and where therefore there are numerous user modems 1.

Figure 1:
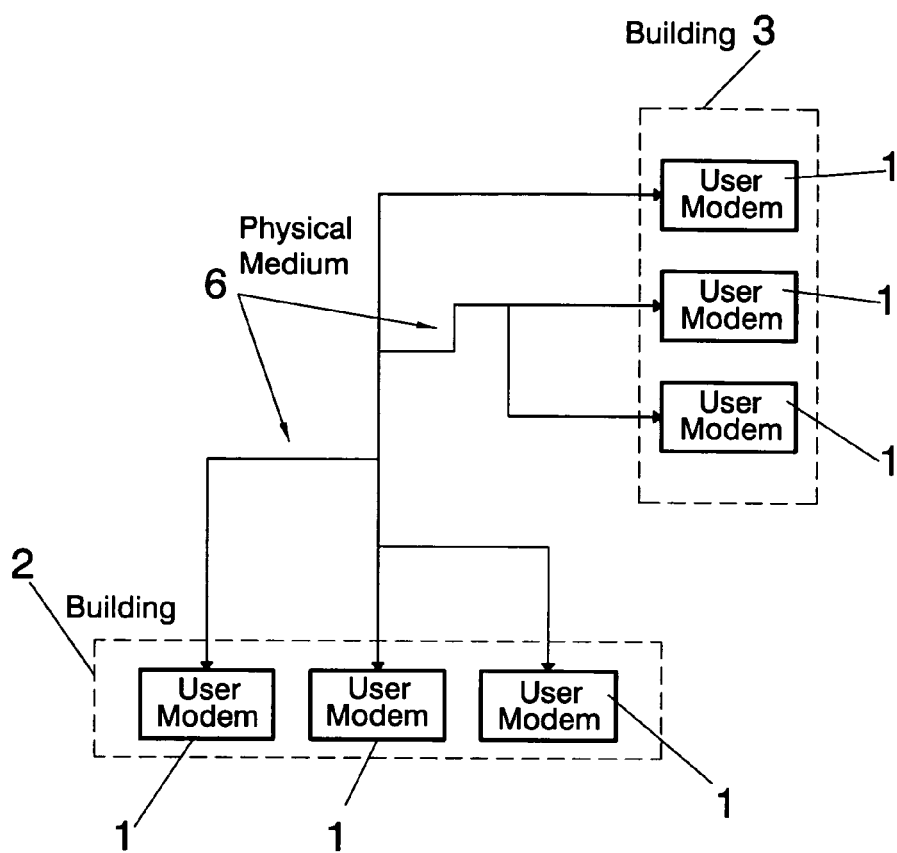
FIG. 1. Shows a typical multi-user, point to multi-point communication scenario where a modem communicates with various user modems distributed through different buildings.

The example in FIG. 1 shows a series of user modems 1 in a building 2 and a user group 1 in the building 3.

Figure 2:
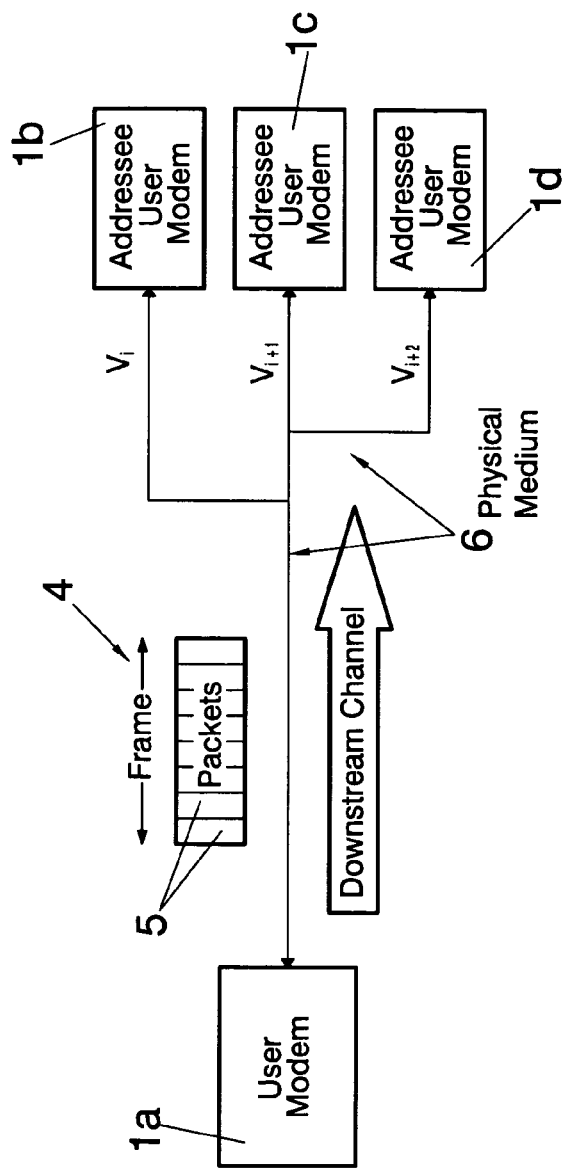
FIG. 2. Shows an example of communication between a user modem and three other modems showing the transmission frame and the different speeds for each one of the users.

Since the invention is applicable to the downstream channel, FIG. 2 shows a user modem 1a transmitting data to three user modems 1b-1d with different speeds $v_i$, $v_{i+1}$, and $v_{i+2}$.

The speed $v_i$, is the number of bits per second that can be sent from the transmitter 1a to the user modem 1b-1d.

The transmitter takes charge of assigning communication bandwidth over the physical medium 6 by means of an arbiter unit as will be mentioned later.

In a point to multi-point system with different transmission speeds the need to define quality of service that ensures differing efficient latencies for different users is considered.

The transmission speed for each user modem may be very different. For example in an "OFDM" (orthogonal frequency division multiplexing) communication system, the speed depends on the number of bits per carrier, and this last value depends on the quality of certain channel parameters in this carrier.

In this communication system, for example, if a user modem 1b is much closer to the transmitter 1a than another modem 1d, giving a more optimistic bit configuration per carrier to the modem 1b than to the modem 1d in each OFDM symbol, more bits can be sent to the nearest rather than the furthest away user, without loss of quality, due to the fact that attenuation is less.

In a traditional system, where the speed that unites the origin with all the addressees is the same, a maximum number of bytes (MTU) for all packets that will be transmitted is fixed. Therefore, each packet occupies the same channel time and it can be guaranteed that the reception latencies for all the remote users will not surpass a certain value. On the contrary in a system where each addressee has a different speed, if there is the same MTU for all addressees the channel time that the packets will use depends on the speed, so latencies cannot be guaranteed.

The process of this invention sets the channel time to be equal for all the addressee modems, independently of the speed in each channel. Therefore transmission to each addressee modem 1b-1d has a maximum number of bytes (MTU), that will be different for each modem.

Consider the example in FIG. 2, where two user modems 1b and 1c are selected, and where 1b is further away from the modem 1a than the modem 1c. Consider that there are speeds $v_i$ and $v_{i+1}$ associated to communications 1a to 1b and 1a to 1c respectively (where $v_i$ is greater than $v_{i+1}$). Taking into account that in an OFDM communication system the speeds $v_i$ and $V_{i+1}$ are translated into number of bits per carrier, then in each OFDM symbol one can introduce and send $N_1$ bits for the modem 1b and $N_2$ bits for the modem 1c, since the time that each symbol lasts is known and it is the same for each addressee modem.

In this example, each packet at a maximum occupies N number of OFDM symbols. Therefore, the channel time for each packet is controlled and it can be calculated that the MTU for modem 1b is N1*N and the MTU for modem 1c is N2*N, guaranteeing the latencies for all the user modems to whom they transmit information.

Another problem that is found in a multipoint configuration where each addressee has a different speed is the need to guarantee reception bandwidth in the different addressee user modems 1b-1d. To achieve this, the channel is divided in time. For example, in an OFDM communication system the number of symbols are grouped in frames 4. The definition of each frame is carried out taking into account the bandwidth that it is wished to reserve for each user modem 1b-1d.

Figure 3:
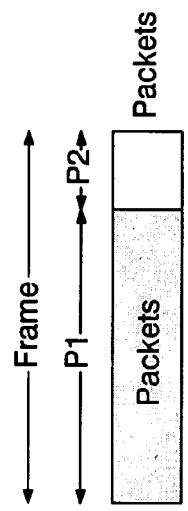
FIG. 3. Shows a possible example of the reservation of percentages of the packets in the frame for two addressee users with different quality requirements.

For example, taking the configuration presented previously in FIG. 2, it is possible to reserve 80% of the bandwidth for the modem 1b and the remaining 20% for the modem 1c. This scenario is demonstrated in FIG. 3. The transmitter uses an arbiter unit to determine to which addressee modem the current packet should be transmitted.

Taking into account that the channel is divided into frames 4 and that each packet occupies the same channel time, the channel can be divided into packets 5, thus facilitating the functioning of the arbiter.

The arbiter must decide, at each moment, which packet must be transmitted. In the previous example the modem 1b has 80% reserved and the modem 1c 20%, this reserve implies that the transmitter had to send P1 packets to the user modem 1b where P1 is 80% of the frame 4 and P2 packets for the user 1c here P2 is 20% of the packets in the frame 4.

In this situation, the arbiter decides at each moment which packet to transmit taking into account that of the P packets in the frame, the percentage P1 must be the percentage of packets for the user of modem 1b and P2 the percentage of packets for the user of modem 1c. 7

The packets that will be sent to each user modem are stored in the transmitter 1a. In the management of these stored packets, one must take into account that for each addressee user there are a number of stored packets and the transmission order of these packets for each user is carried out according to packet priority and if there are two packets with the same priority then these are sent by order of arrival (from the oldest to the most recent). For example, a possible implementation of this storing could occur in a FIIFO (first in, first out) memory for each user, address and priority. When the arbiter decides which user to transmit to, it selects the packet to transmit taking into account the priorities.

The concepts of reserved bandwidth and maximum latency unite to offer different qualities of service. For this, every time that a packet can be sent, the user to receive the packet is identified and furthermore, the maximum length that this packet can have (MTU) is calculated. Taking the MTU and the addressee into account, the packets are extracted from the queues according to the priorities of the packets, and then they are aggregated. To construct the packet with the maximum length, not only are packets joined, but they are also divided to adjust to the maximum length (MTU) calculated for this addressee user modem.

The users are grouped depending on the quality of service required. A group of users without quality of service requirement also exists, that is, they do not require bandwidth or maximum latency. The packets for users without quality of service requirements enter in a frame in a moment when the arbiter has no packets to send to the users that require quality of service.

For example, in a situation with three user modems 1b-1d, where 1b has 80% reserved and the modem 1c has 20% reserved, then 1d has 0% reserved. The arbiter always sends packets to the modems 1b and 1c and in the case that it does not have packets for these user modems, it sends data to the modem 1d. The user modem 1d has a channel speed of $v_{i+2}$ and therefore it has a MTU that does not affect the latencies of the users profile (in this example 1b and 1c).

In particular, the users are divided into two principal groups, one group with a percentage of reserved bandwidth (type A) and the other without any reserved percentage (type B). The arbiter gives priority to type A. The possibility of considering a percentage of reserved bandwidth for all type B exists, thereby guaranteeing that all the type B users will have very low bandwidth but will receive packets. A third option consists of considering all the type B users globally as one extra type A user.

On the other hand, data packets on the line include a header that occupies certain channel time. The process proposed optimises the time applied to headers with respect to the time used in the channel for the transmission of data, arriving at an efficient compromise between the time needed for headers and the time used for the transmission of data.

The invention claimed is:

1. A process for transmitting data by a multi-user, point to multi-point digital data transmission system, where various user modems are in two-way communication over a power line, a downstream channel being the channel used in the communication between a user modem and numerous addressee user modems, and an upstream channel being that used in the communication to this specific user modem; wherein the process comprises:
    carrying out the transmission of information at various speeds to various addressee user modems over said power line;
    carrying out time division in the down-stream channel adaptable to the different transmission speeds of the different addressee user modems;
    optimizing a size of a packet to the communications means regardless of upper layers packet size of the communication from the transmitter;
    carrying out packet transmission with different priorities by means of reservation of channel time based on a quality required by the addressee user modems or groups of addressee user modems;

dividing the downstream link in a series of frames with a fixed length where various percentages of the packets sent in the same frame are reserved for the various groups of addressee user modems that share the same quality of service, in terms of criteria selected from reserved bandwidth, maximum latency and combinations thereof; and adapting quality of services (QoS) for a communication traffic to different requests for bandwidth and latency.

2. The process according to claim 1, wherein time division in the downstream channel that is adaptable to the different transmission speeds of the different addressee user modems is undertaken by sending packets of different length in a same channel time, so that information is transmitted at different speeds, depending on a number of usable bits per symbol for each one of the addressee user modems by means of packets with a maximum length fixed in number of bits.

3. The process according to claim 2, wherein to occupy the same channel time a number of symbols to be sent in a packet transmission unit (Maximum Transfer Unit or MTU) of the transmitter is fixed, said number being adjusted to reach a compromise between transmission efficiency in bits per second and quality of service in terms of latency, adapting selectively different types of traffic selected from traffic without minimum latency and bandwidth requirements, traffic with constant bit rates (CBR), traffic with variable bit rates (VBR) and traffic with reserved bandwidth and fixed maximum latency.

4. The process according to claim 3, wherein the packets that must be sent to the various addressee user modems are grouped and/or divided in the transmitter occupying the size fixed in number of symbols in the Maximum Transfer Unit (MTU).

5. The process according to claim 1, wherein if an addressee user modem or group of addressee user modems do not use the percentage reserved for them, said percentage is divided between the rest of the modems or groups of modems to whom information is being transmitted, in function of a determined configuration of selected traffic.

6. The process according to claim 1, wherein within the percentage of packets in the frame reserved for a group of addressee user modems, each modem has its own percentage of packets depending on the quality of service requirements in terms of a criteria selected from reserved bandwidth, maximum latency and combinations thereof.

7. The process according to claim 1, wherein the packets that must be transmitted are stored in user queues ordered by priority, where these priorities are fixed by a higher layer protocol to allow extraction of the packets ordered according to a priority established determining which is the next packet to be sent, to which user and the size of that packet.

* * * * *